US007624067B2

(12) United States Patent
Hargrave et al.

(10) Patent No.: US 7,624,067 B2
(45) Date of Patent: Nov. 24, 2009

(54) BANKRUPTCY CREDITOR MANAGER INTERNET SYSTEM

(75) Inventors: John W. Hargrave, Haddonfield, NJ (US); Alfred T. Francis, Medford Lakes, NJ (US)

(73) Assignee: Glynntech, Inc., Flemington, NJ (US)

( * ) Notice: Subject to any disclaimer, the term of this patent is extended or adjusted under 35 U.S.C. 154(b) by 1963 days.

(21) Appl. No.: 10/029,589

(22) Filed: Dec. 21, 2001

(65) Prior Publication Data

US 2003/0120587 A1 Jun. 26, 2003

(51) Int. Cl.
*G06Q 40/00* (2006.01)
(52) U.S. Cl. .......................................... 705/38; 705/39
(58) Field of Classification Search .............. 705/38–39
See application file for complete search history.

(56) References Cited

U.S. PATENT DOCUMENTS 5,991,733 A * 11/1999 Aleia et al. ..................... 705/8
2003/0061232 A1* 3/2003 Patterson ................. 707/104.1
2005/0021434 A1* 1/2005 D'Loren ...................... 705/36

* cited by examiner

*Primary Examiner*—Thu Thao Havan
(74) *Attorney, Agent, or Firm*—Kenneth P. Glynn, Esq

(57) ABSTRACT

A bankruptcy practice credit manager internet system includes at least one manager processor computer and a plurality of creditor processor computers, each having a conventional microprocessor having a central processing unit with operating system hardware and software for conventional microprocessing and sufficient hardware and software to operate on the internet. There is a bankruptcy practice program on a host server. Secured access is provided for the manager, i.e., bankruptcy counsel, to have access to aspects of the program which would be secured from others changing, deleting or adding information which is unique and critical to counsel's files, e.g., no outside party would be able to change a bankrupt client's information inputted by the manager counsel, yet the creditors could input their own essential information. In another version, bankruptcy courts are included in the system with the highest level of security, bankruptcy counsel having the second highest level of security, and creditors having less security. Third party inquiry read only access could be included in any version.

16 Claims, 3 Drawing Sheets

BANKRUPTCY CREDITOR MANAGER INTERNET SYSTEM

BACKGROUND OF THE INVENTION

1. Field of the Invention

The present invention relates to a bankruptcy practice program in the context of an internet system. More specifically, the present invention relates to the use of a manager processor computer for bankruptcy client attorneys to provide individual bankruptcy client information primarily to creditors and optionally to other parties. This system enables bankruptcy counsel to exchange information with creditors, to bring creditor information into the bankruptcy counsel system, to inform creditors of proposed plans, as well as motions information, hearings and dispositions. In another embodiment, the system is set up for court use primarily to manage bankruptcy files through bankrupt client counsel and creditors, on an internet system.

2. Information Disclosure Statement

The practice of bankruptcy involves not only filling cases with appropriate bankruptcy courts, but also notifying creditors, working with creditor claims, setting up plans, handling motions, hearings and disposing of the cases in accordance with federal and local rules. While bankruptcy-related computer software is available for creation of forms and for docketing and tracking cases, no programs have been created or are available of the type described herein for interactive use via an internet system.

Notwithstanding the prior art, the present invention is neither taught nor rendered obvious thereby.

SUMMARY OF THE INVENTION

The present invention relates to a bankruptcy practice credit manager internet system. It includes at least one manager processor computer having a conventional microprocessor having a central processing unit with operating system hardware and software for conventional microprocessing. It includes sufficient hardware and software to operate on the internet and includes connection to operate on the internet. Thus, the manager processor computer, as well as any other computers described herein, may be a pc computer, a laptop, a palm-held unit, an internet-capable cell unit, a mainframe or any other internet capable unit.

The manager processor computer(s) of the present invention system is functionally connected to an internet system and has secured access to bankruptcy practice program on a host server. By "secured access" is meant that the manager, i.e., bankruptcy counsel, his employees and agents, would have access to aspects of the program which would be secure from others changing, deleting or adding information which is unique and critical to counsel's files. For example, no outside party would be able to change a bankrupt client's information inputted by the manager, such as personal data, financial data, case or docket numbers, motion information and dates, dispositions, and the like.

There are also a plurality of creditor processor computers, each of these creditor processor computers having a conventional microprocessor having a central processing unit with operating system hardware and software for conventional microprocessing, including sufficient hardware and software to operate on the internet and having connection to operate on the internet. The plurality of creditor process computers is functionally connected to an internet system and has access to bankruptcy practice program on a host server.

There is an internet system and at least one host server, having a bankruptcy practice program with a homepage and with sufficient software to:

provide to the manager processor computer access to the bankruptcy practice program, with secured access to the program to set up individual bankrupt client case files, which are secured to prevent any other users from write functions with respect thereto, editing capabilities, input, and transmittal capabilities for notices;

provide to the plurality of creditor processor computers access to the bankruptcy practice program, with limited access to provide informational access, claimant creditor information sheet inputs and valid voting capability for plans, and to deny the plurality of creditor processor computers access to the secured manager processor computer write functions.

In some preferred embodiments of the bankruptcy practice credit manager internet system of the present invention, the manager processor computer and the plurality of creditor processor computers include e-mail capabilities for communication with one another via the host server.

In other preferred embodiments of the present invention, the bankruptcy practice credit manager internet system may further include third party processor computers, which are provided read only access to the bankruptcy practice program via the host server on the internet. In other embodiment, the third party processor computers may include e-mail capabilities via the host server for communications with the manager processor computer(s) and plurality of creditor processor computers.

The bankruptcy practice credit manager internet system present invention bankruptcy practice program home page may include general case information and links to individual debtor and case information files, as well as plans of reorganization for bankrupt clients having plans of reorganization, including documents, links, and plan information. The bankruptcy practice program may also provide access to claims motions, decisions and dispositions, and even recent case developments.

In preferred embodiments, the bankruptcy practice credit manager internet system of may provide access to bankrupt client files by claim number or case number identification, and, in some programs, only by claim number or case number identification.

In other embodiments of the present invention bankruptcy practice credit manager internet system, it is set up for management by the bankruptcy Court personnel and has essentially a master control by the Court (level one security), a lesser control by the bankruptcy attorneys (level two security), less control by creditors (level three security), and extremely low level access by other third parties, such as read only capabilities. In these embodiments, there would be a main manager processor computer having a conventional microprocessor having a central processing unit with operating system hardware and software for conventional microprocessing, including sufficient hardware and software to operate on the internet and having connection to operate on the internet. When functionally connected to an internet system with a host server with this program, this main manager would have a level one top security access to the bankruptcy practice program with exclusive access to write and edit specified aspects of the bankruptcy practice program, at least one sub-manager processor computer with capabilities similar to that described above for the counsel manager, except that Court specific inputs could not be changed; a plurality of creditor processor computers having capabilities as described above, and optionally, third party processor computer connections for general inquiries. E-mail capabilities could also be included.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
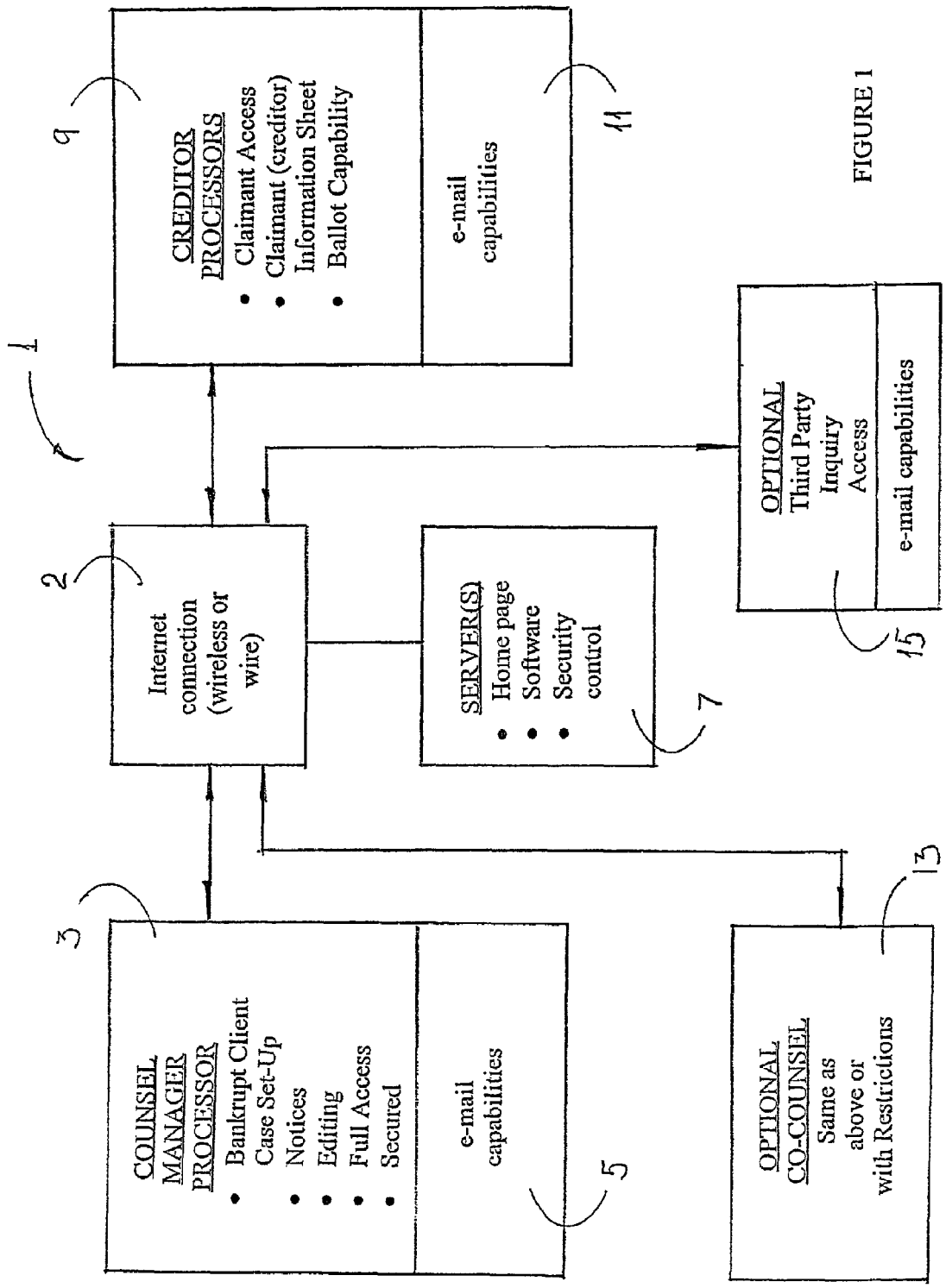
FIG. 1 illustrates a block diagram showing a present invention system for managers at the counsel level.

The present invention system is illustrated by way of example with reference to the Figures. FIG. 1 illustrates a present invention system 1 in block form. System 1 includes a counsel manager processor 3, but more than one could be included, such as intranet-connected processors or co-counsel arrangements. It includes e-mail capabilities 5. It is connected to the internet by any known connection 2, to host server 7, which contains the website for the bankruptcy practice program and includes the homepage, the necessary program software, and the access controls. Counsel manager processor 3 includes capabilities to set up cases, create and send out notices, edit, etc. creditor processors 9 are likewise connected as is processor 3 but has more limited access than processor 3, but minimally permits claim access, information sheet creation for a claim, and plan information and balloting capabilities when plans are included. E-mail capabilities are also included for communications with the processor 3. Optional third party inquiry access 15, with or without e-mail capabilities may also be included.

Figure 2:
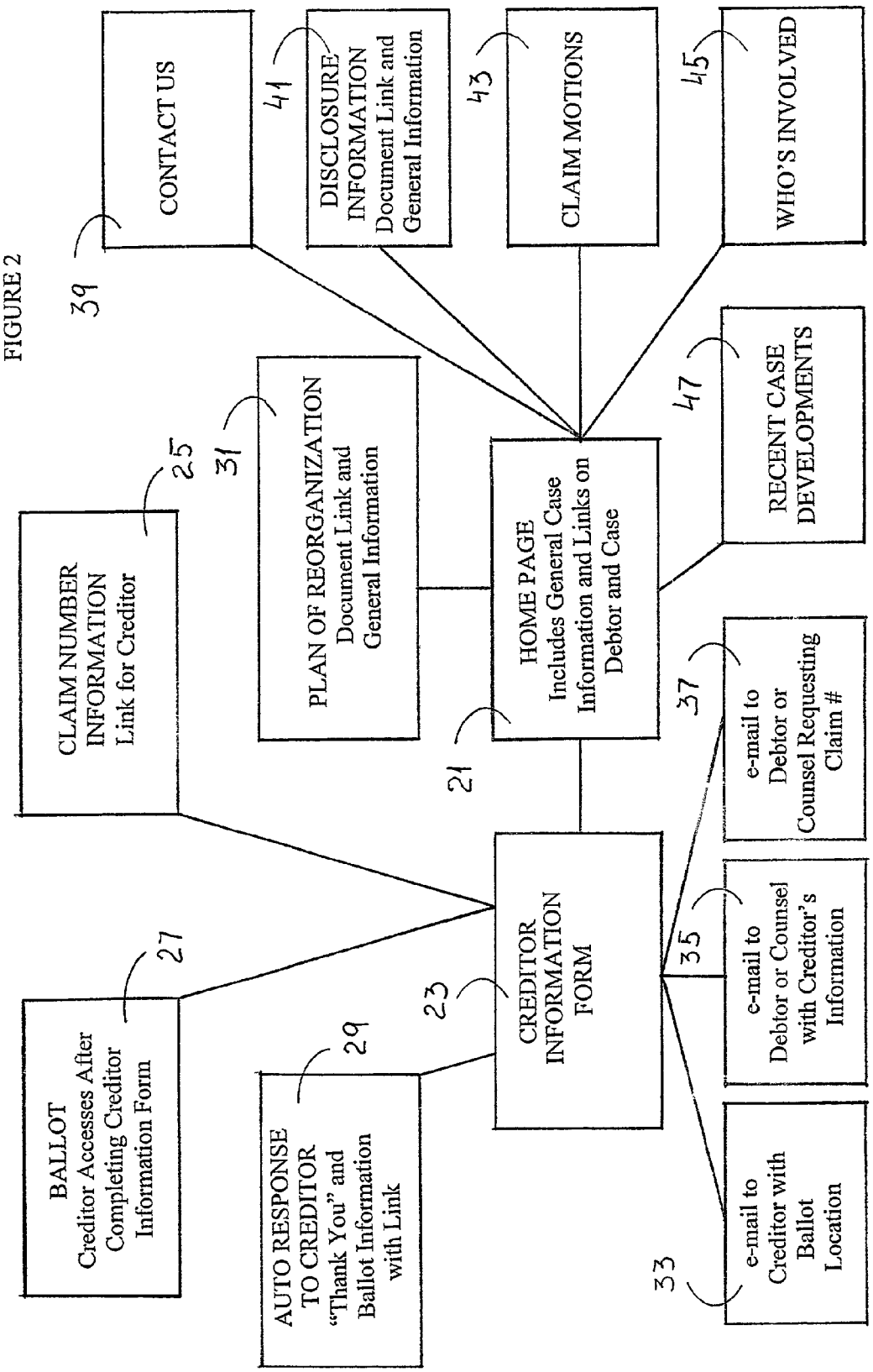
FIG. 2 illustrates the details of functions utilized in one preferred embodiment of the present invention counsel level system.

FIG. 2 illustrates in block form, details of the various capabilities, which would be provided by the present invention system, bankruptcy practice program. Thus, home page 21 includes general case information and links to the particular debtor and case. Creditor information form 23 would be an important link as would claim number information 25 and ballot 27, which would be accessible to the creditors after completing creditor information forms. In this embodiment there would be an automatic response to creditor 29, which would occur after completion of creditor information form 23 and could provide ballot information link. Emails 31 through 37 could be used for specific communications as indicated on the figure. A Plan of Reorganization 31 would also be available through home page 21 as well as Disclosure Information 41 and Claim Motions 43. Additionally, other home page selections could be included such as a Contact Us option 39, a Who's Involved option 45, and/or a Recent Case Development 47.

Figure 3:
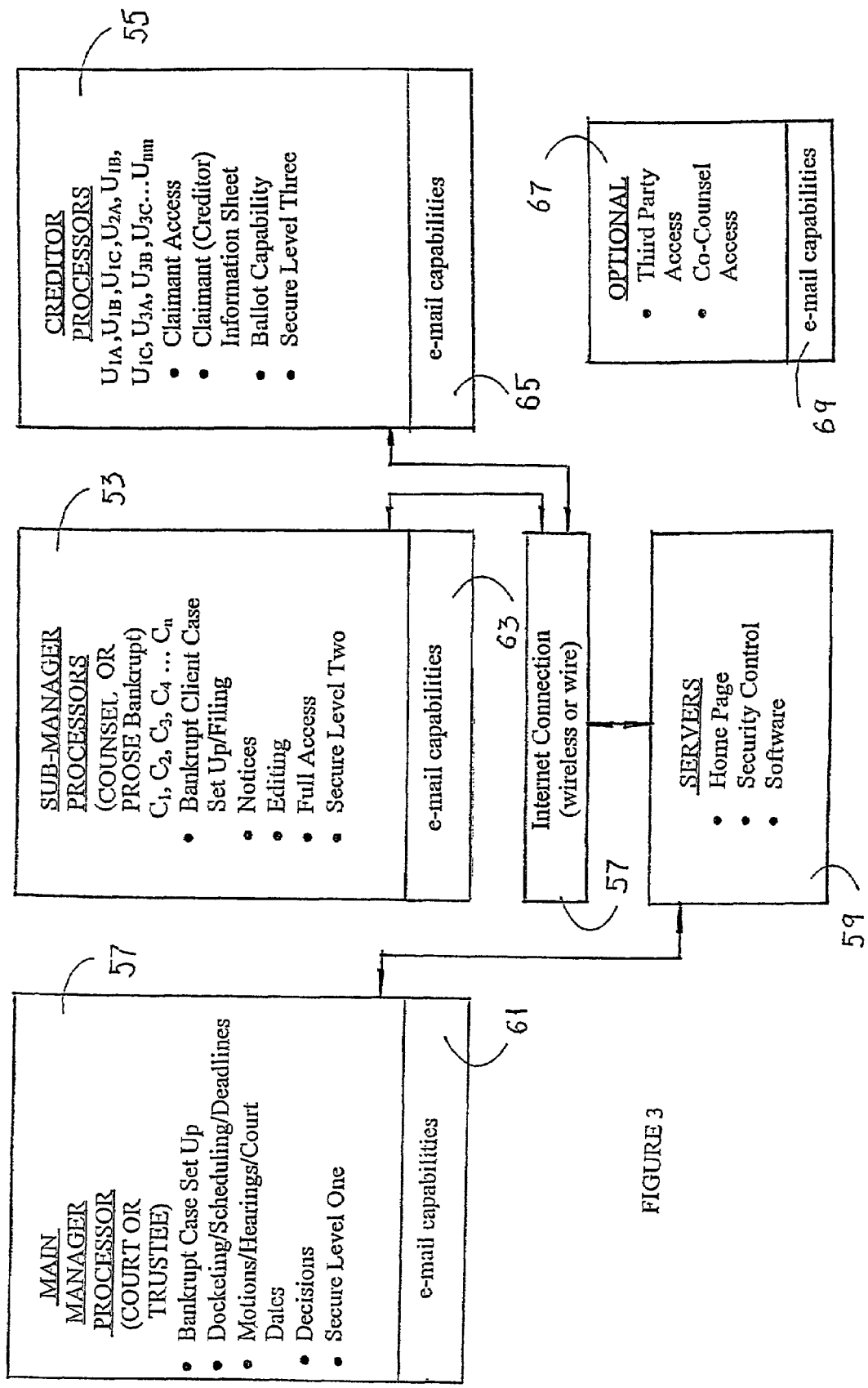
FIG. 3 shows a block diagram of one embodiment of the present invention system operated by a bankruptcy court system.

FIG. 3 illustrates an alternative embodiment present invention system in block form adapted for the bankruptcy court itself to function on the system as the main manager. This system includes a main manager processor 57 for the court (or its designee(s), such as a trustee) for setting up cases, docketing and scheduling, and setting deadlines, for setting up and deciding upon motions, schedule hearings and other court dates, and to distribute and/or present decisions. This main manager processor(s) would have the most functional options and the highest level of preventing others form access to uniquely court functions, i.e., level one security.

The system of FIG. 3 also includes a plurality of sub-manager processors 53, similar to the counsel manager processor 3 of FIG. 1, but with access denied to secured aspects of the program available for inputs, changes and deletions only by the courts, aka level two security. It includes e-mail capabilities 5. These processors 53 and 57 are connected to the internet by any known connection 57, to host servers 59, which contains the website for the bankruptcy practice program and includes the homepage, the necessary program software, and the access controls. Creditor processors 55 are likewise connected as above, but have more limited access than the processors 53 and 57, but minimally permits claim access, information sheet creation for a claim, and plan information and balloting capabilities when plans are included. This is level three security. E-mail capabilities are also included for communications among the various processors and are optional e-mails 61, 63 and 65. Optional third party inquiry access 67, with or without e-mail capabilities 69, may also be included.

Obviously, numerous modifications and variations of the present invention are possible in light of the above teachings. It is therefore understood that within the scope of the appended claims, the invention may be practiced otherwise than as specifically described herein.

What is claimed is:

1. A bankruptcy practice credit manager internet system, which comprises:

(a.) at least one manager processor computer, each of said at least one manager processor computer having a conventional microprocessor having a central processing unit with operating system hardware and software for conventional microprocessing, including sufficient hardware and software to operate on the Internet and having connection to operate on the Internet, said at least one manager processor computer being functionally connected to an internet system and having secured access to a bankruptcy practice program on a host server, said bankruptcy practice program includes a bankruptcy practice program home page that provides access to general case information and links to individual debtor and case information files, and includes access to plans of reorganization for bankrupt clients having plans of reorganization, including documents, links, and plan information, and includes access to bankruptcy court proceedings dates;

(b.) a plurality of creditor processor computers, each of said creditor processor computers having a conventional micro-processor having a central processing unit with operating system hardware and software for conventional microprocessing, including sufficient hardware and software to operate on the internet and having connection to operate on the internet, said plurality of creditor process computers being functionally connector to said internet system and having access to said bankruptcy practice program on a host server;

(c.) third party processor computers, which are provided read only access to said bankruptcy practice program via said at least one host server;

(d.) an internet system, including at least one host server, said at least host server having said bankruptcy practice program with a homepage and with sufficient software to:

(i) provide to said at least one manager processor computer access to said bankruptcy practice program, secured access to said program to set up individual bankrupt client case files, which are secured to prevent any other users from write functions with respect thereto, editing capabilities, and input and transmittal capabilities for notices;
  (ii) provide to said plurality of creditor processor computers access to said bankruptcy practice program, limited access to said program to provide informational access, claimant creditor information sheet inputs and valid voting capability for plans, and to deny said plurality of creditor processor computer access to secured manager processor computer write functions;
  (iii) provide at least three levels of security providing different levels of editing for each level of security, including a master level, an attorney level and bankruptcy client level.

2. The bankruptcy practice credit manager internet system of claim 1, wherein said at least one manager processor computer and said plurality of creditor processor computer include e-mail capabilities for communication with one another via said host server.

3. The bankruptcy practice credit manager internet system of claim 1, wherein said plurality of third party processor computers includes e-mail capabilities, via said host server for communications with at least one of said at least one manager processor computers and said plurality of creditor processor computers.

4. The bankruptcy practice credit manager internet system of claim 1 wherein said home page includes selection options for contacting said at least one manager processor computer.

5. The bankruptcy practice credit manager internet system of claim 1, wherein said bankruptcy practice program provides access to claims motions.

6. The bankruptcy practice credit manager internet system of claim 1, wherein said bankruptcy practice program includes access to recent case developments.

7. The bankruptcy practice credit manager internet system of claim 1, wherein said bankruptcy practice program includes accessing individual bankrupt client files by claim number or case number identification.

8. The bankruptcy practice credit manager internet system of claim 1 wherein there are at least four levels of security providing different levels of editing for each level of security, including a master level, an attorney level, a bankruptcy client level and a third party level.

9. A bankruptcy practice credit manager internet system, which comprises:
  (a) at least one main manager processor computer having a conventional microprocessor having a central processing unit with operating system hardware and software for conventional microprocessing, including sufficient hardware and software to operate on the internet and having connection to operate on the internet, and being functionally connected to an internet system and having a level one top security access to a bankruptcy practice program with exclusive access to write and edit specified aspects of said bankruptcy practice program, said bankruptcy practice program includes a bankruptcy practice program home page that provides access to general case information and links to individual debtor and case information files, and includes access to plans of reorganization for bankrupt clients having plans of reorganization, including documents, links, and plan information, and includes access to bankruptcy court proceedings dates;
  (b) a plurality of sub-manager processor computers, each of said plurality of sub-manager processor computers having a conventional microprocessor having a central processing unit with operating system hardware and software for conventional microprocessing, including sufficient hardware and software to operate on the internet an having connection to operate on the internet, said plurality of sub-manager processor computers being functionally connected to an internet system and having a level two secured access to said bankruptcy practice program with access to write and edit only counsel-related aspects of said bankruptcy practice program;
  (c) a plurality of creditor processor computers, each of said creditor processor computers having a conventional micro-processor having a central processing unit with operating system hardware and software for conventional microprocessing, including sufficient hardware and software to operate on the internet an having connection to operate on the internet, said plurality of creditor process computers being functionally connector to said internet system and having a level two secured access to said bankruptcy practice program with access to write and edit only creditor-related aspects of said bankruptcy practice program;
  (d) third party processor computers, which are provided read only access to said bankruptcy practice program via said at least one host server;
  (e) an internet system, including at least one host server, said at least host server having a bankruptcy practice program with a homepage and with sufficient software to:
    (i) provide to said at least one main manager processor computer access to said bankruptcy practice program, level one secured access to said program to set up individual bankrupt client case files, which are secured to prevent any other users from write functions with respect thereto, editing capabilities and input, and transmittal capabilities for notices, hearings and dispositions
    (ii) provide to said plurality of sub-manager processor computers access to said bankruptcy practice program, level two secured access to said program to set up individual bankrupt client case files, which are secured to prevent any other users from write functions with respect thereto, editing capabilities and input, and transmittal capabilities, and with exclusion to level one secured access;
    (iii) provide to said plurality of creditor processor computers access to said bankruptcy practice program, level three access to said program to provide informational access, claimant creditor information sheet inputs and valid voting capability for plans, and with exclusion to level one and level two secured access;
    (iv) provide at least three levels of security providing different levels of editing for each level of security, including a master level, an attorney level and bankruptcy client level.

10. The bankruptcy practice credit manager internet system of claim 9, wherein said at least one manager processor computer and said plurality of creditor processor computer include e-mail capabilities for communication with one another via said host server.

11. The bankruptcy practice credit manager internet system of claim 9, wherein said at least one manager processor computer and said plurality of creditor processor computer include e-mail capabilities for communication with one another via said host server.

12. The bankruptcy practice credit manager internet system of claim 9, wherein said home page includes selection options for contacting said at least one manager processor computer.

13. The bankruptcy practice credit manager internet system of claim 9, wherein said bankruptcy practice program provides access to claims motions.

14. The bankruptcy practice credit manager internet system of claim 9, wherein said bankruptcy practice program includes access to recent case developments.

15. The bankruptcy practice credit manager internet system of claim 9, wherein said bankruptcy practice program includes accessing individual bankrupt client files by claim number or case number identification.

16. The bankruptcy practice credit manager interact system of claim 9 wherein there are at least four levels of security providing different levels of editing for each level of security, including a master level, an attorney level, a bankruptcy client level and a third party level.

\* \* \* \* \*